Patented Nov. 25, 1930

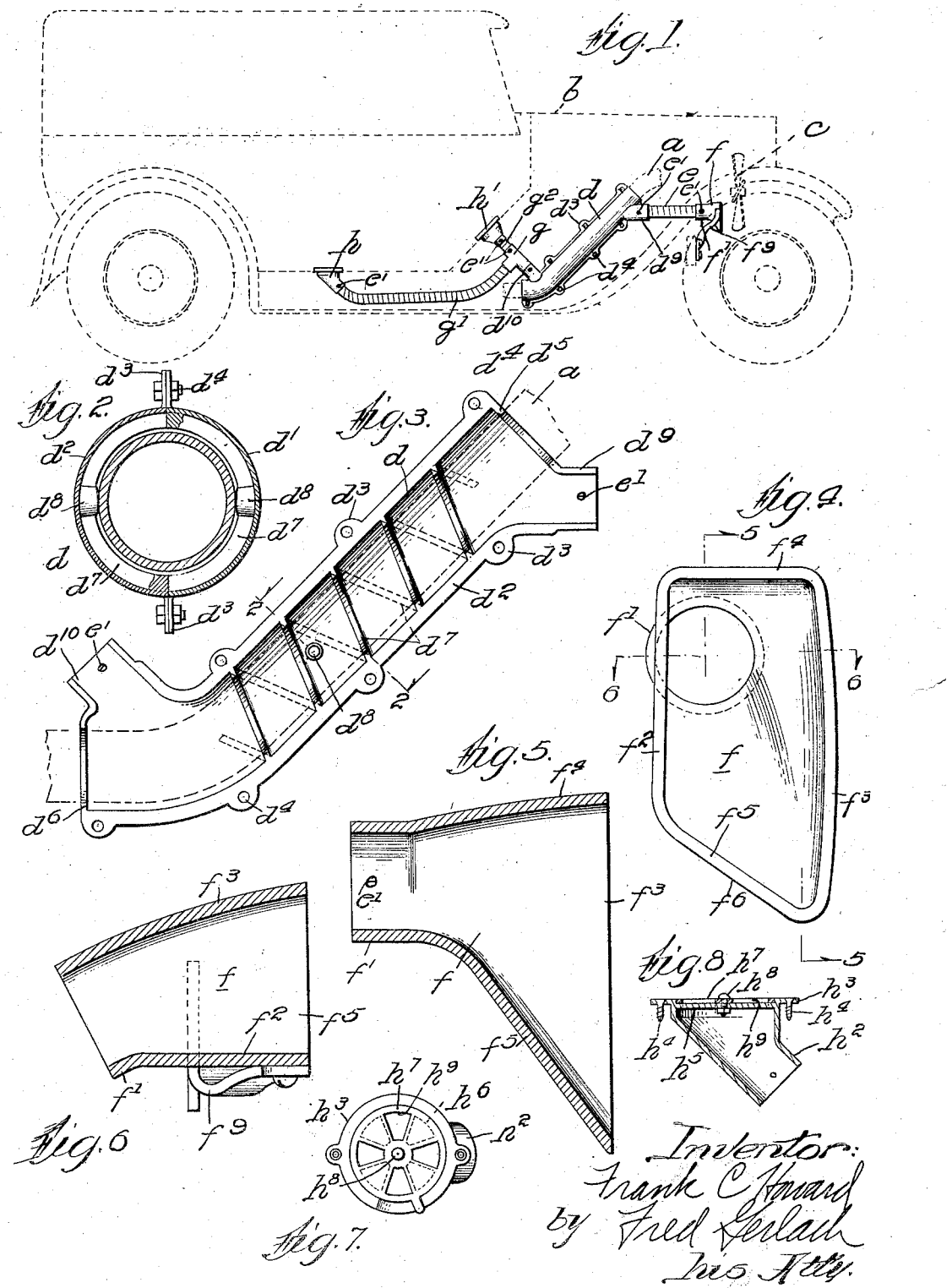

1,782,652

UNITED STATES PATENT OFFICE

FRANK C. HOWARD, OF CHICAGO, ILLINOIS

HEATER FOR VEHICLES

Application filed October 19, 1927. Serial No. 227,076.

The invention relates to heater for vehicles.

The object of the invention is to provide a heater by which air will be heated from the exhaust pipe of the internal combustion motor and conducted into the body of the vehicle, which may be easily installed, which is efficient in operation, and which can be produced at a low cost.

The invention consists in the several novel features hereinafter set forth, and more particularly defined by claims at the conclusion hereof.

In the drawing: Fig. 1 is a diagrammatic view of the invention applied to a motor driven vehicle. Fig. 2 is a transverse section through the heater and the exhaust pipe. Fig. 3 is an elevation of one of the sections forming the tubular heater. Fig. 4 is an end view of the deflector connected to the air inlet for the heater. Fig. 5 is a section on line 5—5 of Fig. 4. Fig. 6 is a section on line 6—6 of Fig. 4. Fig. 7 is a plan of the outlet valve for controlling the delivery of heated air into the body of the vehicle, and Fig. 8 is a section.

The invention is exemplified in a heater applied to the exhaust pipe $a$ for carrying off the products of combustion from the internal combustion motor of usual construction for propelling the vehicle $b$. The vehicle is equipped with the usual fan $c$ for drawing air through the radiator for cooling the water around the motor, which is driven as well understood in the art.

The heater comprises a tubular member $d$ which is formed of complementary semi-cylindrical sections $d'$ and $d^2$. The sections are preferably formed of cast aluminum and are provided with lugs $d^3$. Bolts $d^4$, passing through said lugs, are adapted to secure the sections together to form a tubular member for enclosing a portion of the exhaust pipe. At one end, the sections are each provided with a rib $d^5$ to close the chamber between the pipe and said member, and at its other end they are provided with a similar rib $d^6$ to close the other end. The member is provided with a helical rib $d^7$ which projects inwardly from the sections to cause the air forced through the member $d$ to travel in a helical course. The sections are provided with integral inwardly extending lugs $d^8$ which project slightly inward of the inner edge of the helical rib $d^7$ so that the helical rib will be spaced sufficiently from the exhaust pipe to permit some of the air to pass between the ribs and the pipe. This, in practice, has been found to result in efficiency in heat transmission. This exemplifies a tubular member formed of sections adapted to be applied to an exhaust pipe which is simple in construction and in which a rib and sections are integrally formed.

An inlet nipple $d^9$ is formed by complementary semi-cylindrical portions integrally formed with the sections. This nipple is oblique to the axis of the member $d$ and directs air into one end of the member $d$. An outlet nipple $d^{10}$ is formed of semi-cylindrical extensions of the sections of the member $d$ at the other end of said member.

A section of flexible metallic tubing $e$ extends into the nipple $d^9$ and is secured therein by a cotter pin $e'$. A deflector $f$, preferably formed of an aluminum casting, is provided with an integral nipple $f'$ which is connected to the flexible pipe section $e$ by a cotter pin $e'$. This deflector comprises side walls $f^2$ and $f^3$, a slightly flared top wall $f^4$, and a steeply flared or inclined lower wall $f^5$, the lower edge of which is inclined, as at $f^6$. These walls direct a portion of the current of air from the fan $c$ into the inlet pipe $e$, the nipple being disposed at one side of, or axially offset with respect to the rim of the deflector so that the air entering it has a tendency to swirl. This swirling movement of the air has been found in practice to result in the efficient forcing of the air into the heater.

A T-fitting $g$ is suitably connected to the outlet nipple $d^{10}$ of the heater. A section of flexible hose $g'$ leads from one branch of the fitting $g$ to a valve $h$. A short flexible pipe section $g^2$ leads from the other member of fitting $g$ to a valve $h'$. The valve $h'$ is disposed in the foot-board in front of the driver's seat, and the valve $h$ is usually located in the floor rearwardly of the driver's seat. The flexible pipe sections $g'$ and $g^2$ are each connected to fitting $g$ and to the valves by cotter pins $e'$ similarly to the connections for the inlet pipe sections $e$. By employing these cotter pins, the parts of the heater may be readily assembled and disassembled when desired.

Each valve $h$, $h'$ comprises a nipple $h^2$ to receive one of the flexible pipe sections, an annular flange $h^3$, adapted to be secured to the floor of the vehicle by screws $h^4$, a wall $h^5$ having openings $h^6$ therein, and a registry valve $h^7$ pivoted by a bolt $h^8$ to the wall $h^5$ and provided with openings $h^9$ adapted to be brought into and out of registry with the openings $h^6$ to control the delivery of air into the body of the vehicle.

In applying the improved heater to a vehicle, the sections of the member $d$ are clamped around the exhaust pipe $a$. The deflector $f$ is secured by a bracket $f^3$ to any suitable projection on the motor, and the valves are inserted in holes cut in the floor of the vehicle. The flexible pipe sections for conveying air from the deflector to the heater and from the heater to the valves may be readily installed by the insertion of the cotter pins $e'$.

In operation, a portion of the current of air produced by the fan $c$ is directed by the deflector $f$ into the intake pipe $e$. From this pipe, it passes into one end of the heater member $d$. Some of the air is directed in a helical path by the rib $d^7$, and some is directed into close contact with the exhaust pipe by a small space between the rib and the pipe. In transit through the member $d$, the air will be thoroughly heated for delivery into the car through pipes $g'$ and $g^2$. To control the operation of the heater, it is only necessary to open or close the registry valves $h^7$. This can be done by the occupants while in the car, thus dispensing with indirect connections for controlling the heater.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a heater for a vehicle having an internal combustion motor, the combination of a tubular heater member adapted to extend around the exhaust pipe of the motor, an integral helical rib on the inner periphery of said member, to direct air helically around the exhaust pipe, means to hold the member so that the rib is spaced from the pipe to permit some of the air to pass between the rib and the pipe, means to direct air from the motor fan into one end of said member, and means connected to the other end of the member to convey the heated air into the body of the vehicle.

2. In a heater for a vehicle having an internal combustion motor, the combination of a tubular heater member composed of cast sections adapted to extend around the exhaust pipe of an internal combustion motor, means integral with the sections forming a helical rib on the inner periphery of the member, to direct air helically around the exhaust pipe, means to hold the member so that the rib is spaced from the pipe to permit some of the air to pass between the rib and the pipe, means to direct air from a fan into one end of said member, and means connected to the other end of the member to convey the heated air into the body of the vehicle.

3. In a heater for a vehicle having an internal combustion motor, the combination of a tubular heater member composed of cast sections adapted to extend around the exhaust pipe of the motor, means integral with the sections forming a helical rib on the inner periphery of the member, to direct air helically around the exhaust pipe, means integral with the sections forming an inlet nipple at one end of the member, means to direct air from a fan into said inlet, means integral with the sections forming an outlet nipple adjacent the other end of the member, and means connected to the outlet nipple to convey the heated air into the body of the vehicle.

4. In a heater for a vehicle having an internal combustion motor, the combination of a tubular heater member adapted to extend around the exhaust pipe of the motor, an inlet nipple at one end of the member, a deflector adapted to receive air from the motor fan and comprising a substantially polygonal shaped rim portion and an outlet nipple, said outlet nipple being positioned adjacent to one of the corner parts of the polygonal rim portion and joined to said rim portion by walls which are arranged so that the air from the fan has a tendency to swirl when passing through the outlet nipple, a connection between the two nipples, and means to convey the heated air from the other end of the heater member to the body of the vehicle.

Signed at Chicago, Illinois, this 6th day of October, 1927.

FRANK C. HOWARD.